(12) United States Patent
Hathaway

(10) Patent No.: US 8,297,820 B2
(45) Date of Patent: Oct. 30, 2012

(54) LIGHT-PIPE BASED IDENTIFICATION AND LOCATION SIGNALING LIGHT

(76) Inventor: Kevin Joseph Hathaway, Saratoga, CA (US)

( * ) Notice: Subject to any disclaimer, the term of this patent is extended or adjusted under 35 U.S.C. 154(b) by 75 days.

(21) Appl. No.: 12/737,762

(22) PCT Filed: Aug. 10, 2009

(86) PCT No.: PCT/US2009/004595
§ 371 (c)(1), (2), (4) Date: Feb. 11, 2011

(87) PCT Pub. No.: WO2010/019219
PCT Pub. Date: Feb. 18, 2010

(65) Prior Publication Data
US 2011/0134657 A1 Jun. 9, 2011

(51) Int. Cl.
*F21V 7/04* (2006.01)
*F21S 10/00* (2006.01)
*B60Q 1/00* (2006.01)

(52) U.S. Cl. ........ 362/555; 362/551; 362/276; 362/558; 362/802; 116/202; 116/206; 340/435; 356/3; 356/21

(58) Field of Classification Search .................. 362/551, 362/555, 558, 184, 276, 802, 103, 105; 116/209, 116/202; 340/432, 435
See application file for complete search history.

(56) References Cited

U.S. PATENT DOCUMENTS

| | | | |
|---|---|---|---|
| 5,076,003 A | 12/1991 | Chen | |
| 5,117,766 A * | 6/1992 | Nechushtan et al. | 116/209 |
| 5,279,513 A * | 1/1994 | Connelly | 446/219 |
| 5,365,923 A | 11/1994 | Lundberg | |
| 5,414,405 A | 5/1995 | Hogg | |
| 5,697,099 A | 12/1997 | Siska, Jr. et al. | |
| 5,804,829 A | 9/1998 | Palmer | |
| 5,820,438 A * | 10/1998 | Horton, III | 446/213 |
| 5,947,789 A * | 9/1999 | Chan | 446/219 |
| 6,069,557 A * | 5/2000 | Anglin et al. | 340/321 |
| 6,082,876 A * | 7/2000 | Hanson et al. | 362/293 |
| 6,144,302 A | 11/2000 | Cotty, Jr. et al. | |
| 6,244,723 B1 * | 6/2001 | Talamo | 362/208 |
| 6,310,552 B1 | 10/2001 | Stumberg et al. | |
| 6,934,571 B2 | 8/2005 | Wiesmann et al. | |
| 7,088,222 B1 * | 8/2006 | Dueker et al. | 340/321 |
| 7,315,036 B2 | 1/2008 | Ford et al. | |
| 7,315,037 B1 | 1/2008 | Page et al. | |
| 7,341,361 B2 | 3/2008 | Gagne | |

(Continued)

FOREIGN PATENT DOCUMENTS

JP 10021720 A * 1/1998

(Continued)

*Primary Examiner* — Ali Alavi
(74) *Attorney, Agent, or Firm* — Donald E. Schreiber

(57) ABSTRACT

A signaling light source facilitates locating personnel under adverse conditions such as in a smoky environment and resists damage from exposure to a harsh user environment A lighting unit includes at least one, and preferably two, of the signaling light sources also includes at least one personnel identifying red-green-blue ("RGB") light emitting diode ("LED") Disclosed methods for operating the signaling light source include energizing operation of a LED light source by supplying a sequence of electrical current pulses which repeat at a rate which causes emitted light to pulse visually, supplying electrical current to a pair of LEDs alternatively connected either in series or in parallel depending upon battery operating condition, and monitoring smoke density in environment around the signaling light source and modulating the intensity of emitted light responsive to smoke density.

14 Claims, 4 Drawing Sheets

U.S. PATENT DOCUMENTS

| | | |
|---|---|---|
| 2003/0025608 A1 | 2/2003 | Pederson |
| 2005/0063194 A1 | 3/2005 | Lys et al. |
| 2007/0115651 A1 | 5/2007 | Murphy |
| 2007/0171159 A1 | 7/2007 | Lee |
| 2008/0170382 A1 | 7/2008 | Mass |
| 2008/0238838 A1 | 10/2008 | Cunningham |

FOREIGN PATENT DOCUMENTS

| | | | | |
|---|---|---|---|---|
| JP | 2008204943 A | * | 9/2008 |
| JP | 2010212205 A | * | 9/2010 |
| JP | 2012002850 A | * | 1/2012 |

* cited by examiner

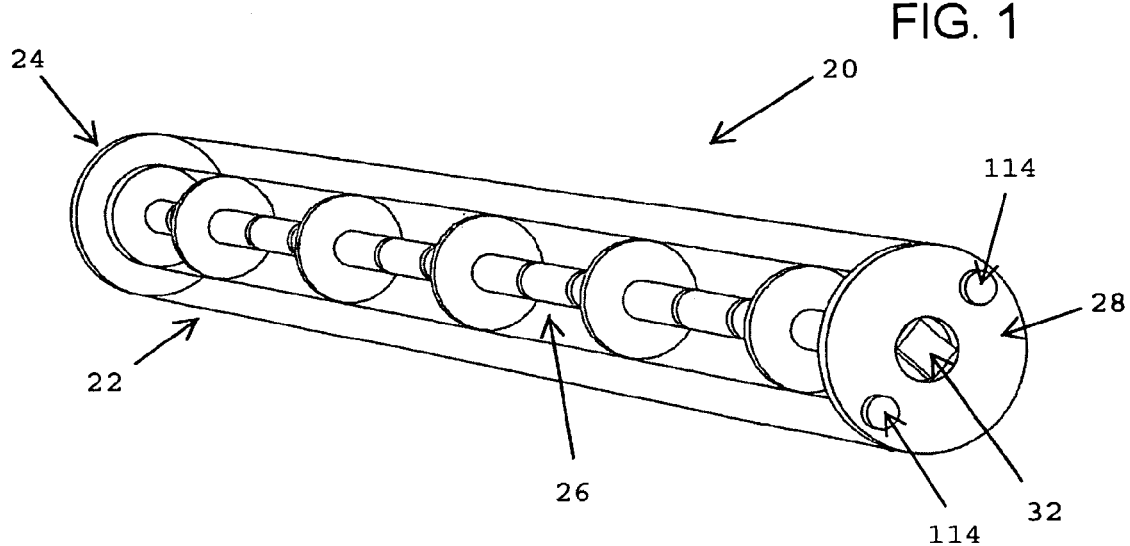
FIG. 1
FIG. 2
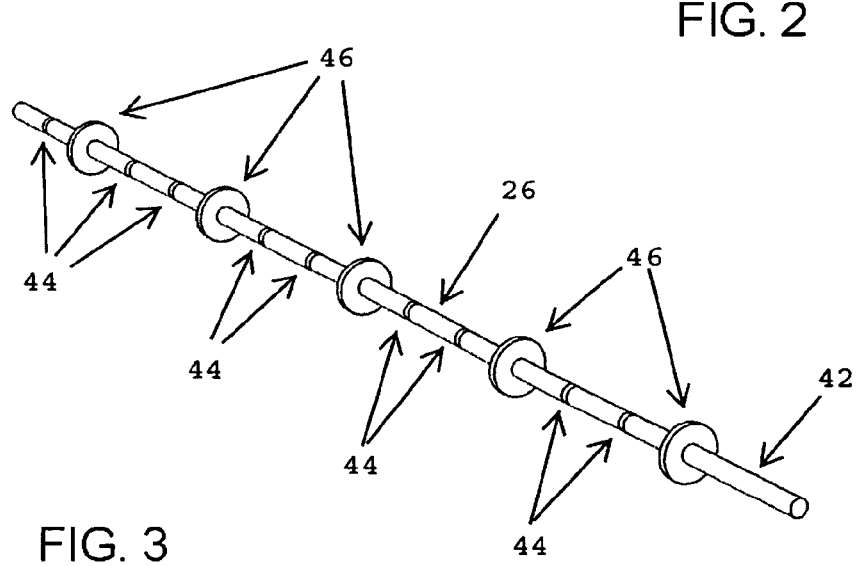
FIG. 3

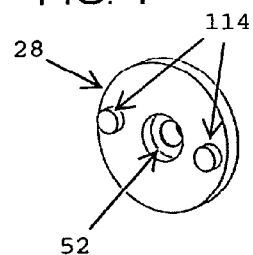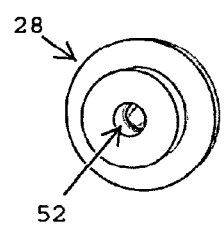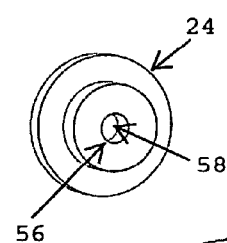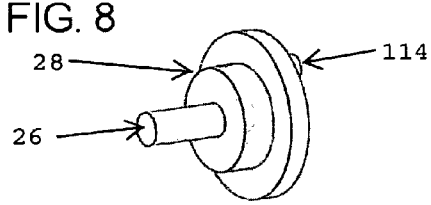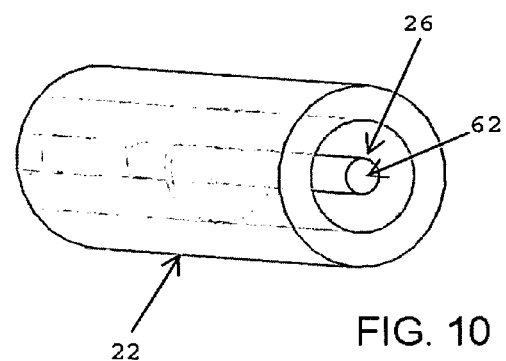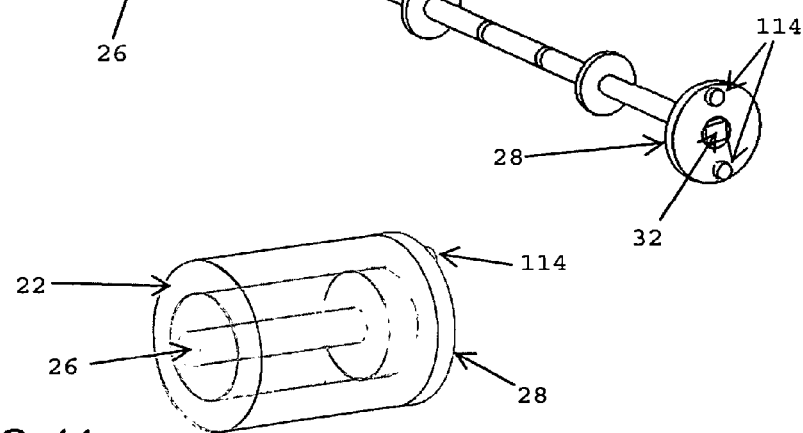

_US 8,297,820 B2_

LIGHT-PIPE BASED IDENTIFICATION AND LOCATION SIGNALING LIGHT

TECHNICAL FIELD

The present disclosure relates generally to the field of illuminated locating devices, and more particularly to devices by which personnel or objects can be identified, particularly under adverse conditions such as in a smoky environment.

BACKGROUND ART

There exist numerous circumstances under which a person would want to have a simple, battery operated, rugged, efficient, color selectable and very portable light source for purposes of signaling others of his or her presence under visually adverse conditions. Such conditions could include locating someone in a dark, smoke-filled room, signaling oncoming drivers of a road emergency, signaling search and rescue personnel if a carrier of the signaling light source becomes lost in the wilderness, signaling drivers of the carrier's presence while riding a bicycle, etc. Of particular interest is the application in a smoke-filled room as often encountered by firefighters and support personnel responding to a building fire, especially under self contained breathing apparatus ("SCBA") conditions.

When firefighting personnel spray water on flames in a burning room, it is quite common for the room to quickly become pitch black and filled with dense smoke, making visibility nearly impossible. If a searcher is using a flashlight or other directed light source, the light must travel from the searcher to personnel and return back to the searcher to visually locate personnel. Even a very intense light source penetrates a short distance through dense smoke. Additionally, the diffusion of the light caused by the smoke tends to obscure the light returning from personnel since diffusive back-glow of light is greatest near the source.

If firefighting personnel carry or wear a light source, the optical path length between personnel and a searcher is cut in half. Also, since the searcher is not using his or her own light source, there is no back-glow to obscure personnel's light, making location possible at a much greater distance. By putting the signaling light source on personnel, the searcher has the additional visual cue of increased luminous intensity to help locate the personnel.

In addition to rapidly locating personnel in a dense smoke environment, searchers also need to rapidly discern as much as possible about the personnel's identity. Having the ability to preset a color code for individual personnel prior to entering a burning building subsequently provides searchers with additional early stage identification information.

Experimental testing in dense smoke-filled rooms establishes that light of a particular color is more visible in a smoky environment than other colors. Consequently, a signaling light source emitting a color of light that is more visible in a smoky environment increases the likelihood of locating firefighters under such circumstances.

A firefighter's signaling light source must be extremely durable, reliable, water and temperature resistant and should provide long battery life. Also, firefighting equipment must be easily cleaned after a fire, typically with solvents or strong detergents. Therefore, any potentially sensitive components included in a signaling light source need to be well isolated from such environmental conditions.

Disclosure

An object of the present disclosure is to provide a signaling light source that penetrates smoke well.

Another object of the present disclosure is to provide a signaling light source that is visible over a very wide angle.

Another object of the present disclosure is to provide a signaling light source that resists damage through exposure to harsh user environments.

Another object of the present disclosure is to provide a signaling light source that permits rapidly identifying individual personnel.

Briefly, in one aspect disclosed herein is a signaling light source particularly adapted for facilitating locating personnel under adverse conditions such as in a smoky environment. The disclosed signaling light source also resists damage from exposure to a harsh user environment. The signaling light source includes a hollow, translucent environmental isolation tube that encloses a light distributing rod. The light distributing rod has a diffusive light-pipe. Reflective end caps included in the signaling light source:

1. mate with open ends of the environmental isolation tube; and
2. with opposite ends of the light-pipe, for sealing the light distributing rod within the environmental isolation tube. At least one of the end caps is juxtaposable with a light source which when energized emits light into the light-pipe of the light distributing rod for reemission from the light-pipe.

Briefly, in another aspect disclosed herein is a lighting unit particularly adapted for facilitating locating personnel under adverse conditions such as in a smoky environment. The lighting unit includes at least one, and preferably two, of the disclosed signaling light sources. The lighting unit further includes at least one personnel identifying red-green-blue ("RGB") light emitting diode ("LED") that emits a selectable color of light for uniquely identifying personnel in a smoky environment.

Briefly, in yet another aspect disclosed herein is a method for energizing operation of a LED light source included in the signaling light source. The method for energizing operation of the LED light source includes the step of supplying a sequence of electrical current pulses to the LED. The electrical current pulses supplied to the LED repeat at sufficiently long intervals of time so that light emitted by the signaling light source pulses visually. Visual pulsing of light emitted by the signaling light source:

1. facilitates a searcher's ability to visually locate personnel; and
b. reduces electrical power required for operating the signaling light source.

Briefly, in even yet another aspect disclosed herein is another method for energizing operation of at least a pair of LED light sources each of which is preferably respectively included in a signaling light source. This second method for energizing operation of the LED light sources includes the steps of:

1. supplying electrical current for energizing operation of the light sources from at least one battery;
2. monitoring battery operating condition;
3. while battery operating condition remains adequate for energizing operation of series connected light sources, connecting the LEDs in series; and
4. when battery operating condition becomes inadequate for energizing operation of series connected light sources, connecting the LEDs in parallel.

This second method for energizing operation of a pair of LED light sources extends the battery energized operating interval of signaling light sources.

Briefly, in a final aspect disclosed herein is yet another method for energizing operation of a LED light source included in a signaling light source. This third method for energizing operation of the LED light source includes the steps of:

1. monitoring smoke density in environment around the signaling light source;
2. when smoke density monitored in environment around the signaling light source indicates dense smoke, increasing energy supplied to the LED light source; and
3. when smoke density monitored in environment around the signaling light source indicates sparse smoke, decreasing energy supplied to the LED light source.

This third method for energizing operation of light sources reduces average electrical power required for operating the signaling light source.

The present invention advantageously places a LED light source and drive electronics inside protective enclosures, and transfers light emitted by the light source into a severe surrounding environment via a signaling light source. The signaling light source is made from extremely durable materials and withstands both the operational environment and clean-up.

The present invention further facilitates rapidly identifying individual personnel while maximizing the distance at which personnel are locatable by separating the location light unit into a color selectable section and a constant color section.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 1 is a partially-sectioned, perspective view depicting a signaling light source in accordance with the present disclosure that includes a light distributing rod, end-caps and an environmental isolation tube;

FIG. 2 is an alternative perspective view depicting the signaling light source depicted in FIG. 1;

FIG. 3 is a perspective view depicting the light distributing rod included in the signaling light-source depicted in FIGS. 1 and 2, the light distributing rod includes an elongated transparent rod light-pipe opposite ends of which are respectively adapted to receive a light-source end-cap and a reflective end-cap;

FIG. 4 is a perspective view depicting a backside of the light-source end-cap included in the signaling light-source of FIGS. 1 and 2 adapted for receiving a light emitting LED light-source;

FIG. 5 is a perspective view depicting a frontside of the light-source end-cap depicted in FIGS. 1, 2 and 4;

FIG. 6 is a perspective view depicting a frontside of the reflective end-cap also included in the signaling light-source depicted in FIGS. 1 and 2 that reflects light propagating along the transparent rod light-pipe from the light-source end-cap;

FIG. 7 is a perspective view depicting a backside of the reflective end-cap depicted in FIG. 6;

FIG. 8 is a semi-transparent, perspective view depicting assembly of the light-source end-cap together with a LED light-source onto the transparent rod light-pipe;

FIG. 9 is a perspective view depicting the transparent rod light-pipe of FIG. 1 having both end-caps assembled thereon;

FIG. 10 is a perspective view depicting the environmental isolation tube of the signaling light-source enclosing the light distributing rod depicted in FIGS. 1, 2 and 3;

FIG. 11 is a perspective view depicting one end of a signaling light-source with the light distributing rod enclosed within the environmental isolation tube that is closed by one of the end-caps depicted respectively in FIGS. 4-5, and in FIG. 6-7;

BEST MODE FOR CARRYING OUT THE DISCLOSURE

Figure 12:
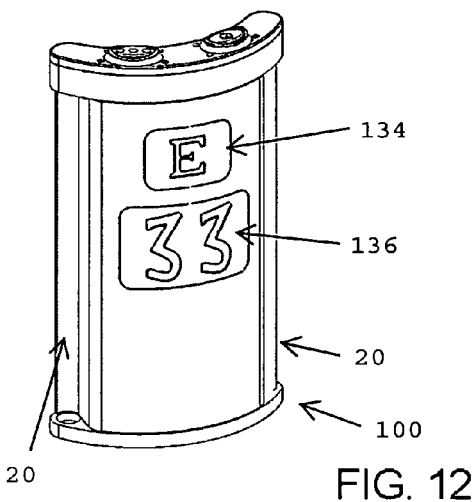
FIG. 12 is a perspective view depicting a lighting unit in accordance with the present disclosure adapted for locating personnel particularly under adverse conditions such as in a smoky environment that has a pair of the disclosed signaling light sources located along opposite sides thereof.

FIGS. 1 and 2 depict a signaling light source in accordance with the present disclosure identified by the general reference character 20. The signaling light source 20 includes an environmental isolation tube 22, a reflective end-cap 24, a light distributing rod 26, and a light-source end-cap 28 that receives a small light source 32. The light distributing rod 26, as better illustrated in FIG. 3, is solid and includes a transparent rod light-pipe 42, a series of narrow and diffusive bands 44 spaced along the length of the light-pipe 42 and, for particular configurations of the signaling light source 20, a series of centering rings 46 that are also spaced along the length of the light-pipe 42.

Preferably, a single LED is used for the small light source 32. The LED selected for the small light source 32 can either emit light at a single humanly visible wavelength, an RGB LED which permits selecting the color of visible emitted light or an infrared ("IR") LED that emits light which is not humanly visible. Advantageously, the small light source 22 can include both a humanly visible the LED 32 and an IR LED 32. Note that if an IR LED is used for or included in the small light source 32, then searchers must be also have equipment for detecting the invisible illumination emitted by an IR LED. Whichever type of LED is used for the small light source 32, it is positioned at one end of the light distributing rod 26 in such a way that most of the light exiting the LED 32 enters the end of the light-pipe 42.

The series of narrow and diffusive bands 44 incorporated onto the outer surface of the light-pipe 42 extract light propagating along the length of the light-pipe 42. The bands 44 are configured to extract light from the light-pipe 42 with more or less uniform brightness along its length. There exist many possible alternative configurations and spacings that provide the same light extracting function as the diffusive bands 44 including various non-banded, graded, diffusive and/or dot patterns. Furthermore, whatever pattern might be selected for providing the light extracting function of the bands 44, in effecting a more or less uniform brightness along the length of the light-pipe 42 the patterns may be non-uniformly spaced along its length. Alternatively, the light extracting function performed by the bands 44 may also be obtained by dispersing a diffusive material into material forming the light-pipe 42. Dispersing a diffusive material into material forming the light-pipe 42 eliminates any requirement for the bands 44 or any other possible alternative diffusive structures on the surface of the light-pipe 42. The scope of the present disclosure includes all various alternative ways for extracting light from the light-pipe 42, preferably those ways that produce a more or less uniform brightness along the length of the light-pipe 42.

The presently preferred configuration for the bands 44 is that in which the bands 44 are:
1. narrow, i.e., less than 2 mm wide;
2. of approximately the same width;
3. spaced approximately uniformly along the length of the light-pipe 42; and
4. cover an area that is generally less that 10% of the total surface area of the light-pipe 42.

This "narrow and few bands" configuration is preferred because it improves visibility of the signaling light source 20 in certain operating environments. For this configuration of the bands 44 on the surface of the light distributing rod 26, most of the light entering the light-pipe 42 propagates along the light-pipe 42 from the light-source end-cap 28 all the way to the opposite end to impinge upon the reflective end-cap 24. Reflecting off the reflective end-cap 24, the light re-enters the light-pipe 42 for another pass along its length. Again, most of the light re-entering the rod from the reflective end-cap 24 makes it back to the light-source end-cap 28 where it reflects from the light-source end-cap 28 back into the light-pipe 42. Since a fairly small percentage of propagating escapes from the light-pipe 42 with each pass along its length, the bands 44 appear relatively uniform in brightness even though they are spaced approximately uniformly along the length of the light-pipe 42. In this way light tends to cycle back and forth several times along the light-pipe 42 before leaving the signaling light source 20. To maximize the overall efficiency of the signaling light source 20, the reflective end-cap 24 must have a high reflectance.

Similar to the bands 44, if the light distributing rod 26 includes the centering rings 46 they are preferably spaced uniformly along the length of the light-pipe 42. The primary function of the centering rings 46 is to locate the light-pipe 42 at the center of the environmental isolation tube 22. However, the centering rings 46 also provide mechanical support both for the light-pipe 42 and for the environmental isolation tube 22. For a sufficiently short signaling light source 20, the light distributing rod 26 may omit the centering rings 46. If the light distributing rod 26 includes the centering rings 46, the centering rings 46 can be either integrated into the light-pipe 42 as one piece or fabricated separately and secured along the light-pipe 42. Integrating the centering rings 46 into the light-pipe 42 provides a path for the light to leak from the light-pipe 42. Therefore, the width of the centering rings 46 is preferably as narrow as practicable (approximately 1.0 mm) to minimize light loss from the light-pipe 42.

Assembly of the signaling light source 20 begins by inserting the light distributing rod 26 having the bands 44 and possibly centering rings 46 into the environmental isolation tube 22. With the light distributing rod 26 located within the environmental isolation tube 22, insertion of the end-caps 24, 28 into opposite ends of the environmental isolation tube 22 centers the light distributing rod 26 therein. Sealing the end-caps 24, 28 to the environmental isolation tube 22 completes assembly of the signaling light source 20 with the environmental isolation tube 22 and the end-caps 24, 28 protecting the light distributing rod 26 against environmental hazards and contamination.

FIGS. 4 and 5 respectively show backside and front-side views, respectively, of the light-source end-cap 28. A cylindrically-shaped hole 52 pierces the light-source end-cap 28 having a diameter on the frontside depicted in FIG. 5 that is adapted to receive one end of the light-pipe 42. As best illustrated in FIG. 4, the diameter of the hole 52 on the backside of the light-source end-cap 28 is larger than that on the frontside. The larger diameter of the hole 52 on the backside of the light-source end-cap 28 adapts it for receiving the small light source, preferably the LED 32. The light-source end-cap 28 is preferably made from a high temperature, white, polymeric material which has been heavily loaded with aluminum oxide or other optical diffusion material thereby making the light-source end-cap 28 highly reflective. While the light-source end-cap 28 is preferably made from a polysulfone material named Ultem sold by SABIC Innovative Plastics of Pittsfield, Mass., suitable polymeric materials also include polycarbonates or poly olefins. Typically, the light-source end-cap 28 is glued into the environmental isolation tube 22. The light-source end-cap 28 accomplishes the following important functions.

1. The light-source end-cap 28 locates one end of the light-pipe 42 directly over the output of the LED 32.
2. The light-source end-cap 28 maintains a fixed and small space (typically about 0.5 mm) between the end of the light-pipe 42 and the LED 32 ensuring high energy transfer efficiency.
3. The light-source end-cap 28 helps direct into the end of the light-pipe 42 received into the hole 52:
    a. light emitted by the LED 32 that does not directly enter the juxtaposed end of the light-pipe 42; or
    b. light which returns to the light-source end-cap 28 from the light-pipe 42.
4. Finally, the light-source end-cap 28 provides an environmental end seal for the environmental isolation tube 22 of the signaling light source 20.

FIG. 6 illustrates the frontside of the reflective end-cap 24. Similar to the light-source end-cap 28, the reflective end-cap 24 has a cylindrically-shaped cavity 56 formed into the frontside thereof that is adapted to receive one end of the light-pipe 42. As depicted in FIG. 7 depicting the backside of the reflective end-cap 24, the cavity 56 extends only part into and does not pass through the reflective end-cap 24. A mirror 58, which could be diffuse or specular, may be incorporated into the reflective end-cap 24 at the base of the cavity 56 to reflect back into the light-pipe 42 the light that is not extracted from the light-pipe 42 by the bands 44 as the light propagates along the light-pipe 42. However, preferably the reflective end-cap 24 is made from the same type of material as described above for the light-source end-cap 28 and omits the mirror 58.

FIG. 8 depicts details of the assembly of the light distributing rod 26 and the light-source end-cap 28 carrying the LED 32. FIG. 9 depicts the light distributing rod 26, best illustrated in FIG. 3, with both end-caps 24, 28 attached including the LED 32 inserted in the light-source end-cap 28. FIG. 10 depicts the light distributing rod 26 located within the environmental isolation tube 22 without the light-source end-cap 28 inserted into the environmental isolation tube 22.

As stated previously, the environmental isolation tube 22 acts as a barrier isolating the light distributing rod 26 from the environment surrounding the signaling light source 20. If the environmental isolation tube 22 is made from a translucent material, it provides some secondary light dispersion adjacent to the bands 44 of the light emanating from the light distributing rod 26. The environmental isolation tube 22 can be made from various different materials but translucent silicone rubber is preferred due to the material's high resistance to chemicals such as solvents and detergents as well as its very high service temperature and thermal stability. FIG. 10 also depicts an input end 62 of the light-pipe 42. The input end 62 should be polished flat with minimal surface roughness to maximize the input efficiency of the light emitted by the LED 32 and to minimize losses out of the light-pipe 42 caused by scattering. The opposite end of the light-pipe 42, not illustrated in FIG. 10, should be similarly polished flat and optically smooth for the same reason. FIG. 11 provides a detail view of one end of the signaling light source 20. The end-caps 24, 28 are typically glued into an end of environmental isolation tube 22 thereby positioning and sealing the light distributing rod 26 therein.

FIG. 12 illustrates a lighting unit in accordance with the present disclosure identified by the general reference character 100 that is adapted for locating personnel particularly under adverse conditions such as in a smoky environment. The lighting unit 100 preferably includes a pair of the signaling light sources 20 that are located along opposite sides of the lighting unit 100. In addition to having the signaling light sources 20 mounted thereon, the lighting unit 100 encloses batteries for energizing operation of the signaling light sources 20, and a micro-controller based electronic circuit for controlling the operation of the signaling light sources 20, neither of which are depicted in any of the FIGs.

Figure 13:
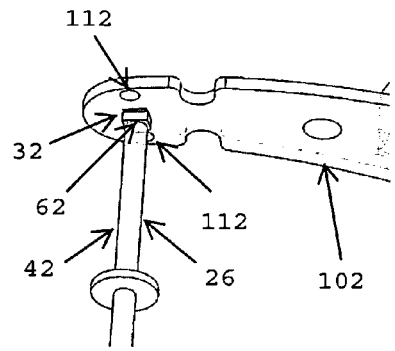
FIG. 13 is a perspective view depicting one end of a printed circuit board ("PCB") included in the lighting unit illustrated in FIG. 12 with an end of the light distributing rod's light-pipe mated therewith.
Figure 14:
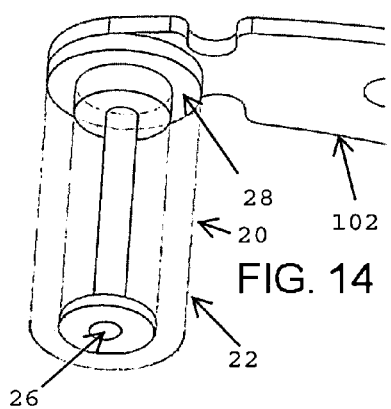
FIG. 14 is a perspective view depicting the end of the PCB illustrated in FIG. 13 with an end of the signaling light source mated therewith.

FIGS. 13 and 14 both illustrate one end of a PCB 102 included in the lighting unit 100 illustrated in FIG. 12. FIG. 13 provides details about the juncture between the light-source end-cap 28 of the signaling light source 20 and the PCB 102 while FIG. 13 shows the entire signaling light source 20 with the light-source end-cap 28 abutting the PCB 102. The illustration of FIG. 13 that omits the light-source end-cap 28, specifically depicts the LED 32 surface mounted both mechanically and electrically on the PCB 102 juxtaposed with the input end 62 of the light-pipe 42. Furthermore, FIG. 13 depicts a pair of alignment holes 112 located on diametrically opposite sides of the LED 32 which respectively receive outwardly-projecting cylindrically-shaped protrusions 114 that project from the light-source end-cap 28 and that appear in FIGS. 1, 2, 4, 8, 9 and 11. Insertion of the cylindrically-shaped protrusions 114 of the light-source end-cap 28 into the alignment holes 112 of the PCB 102 ensures proper alignment between the surface mounted LED 32 and the input end 62 of the light-pipe 42.

Figure 15:
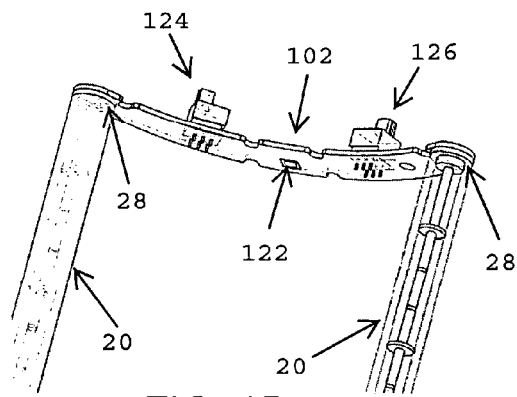
FIG. 15 is a perspective view depicting the entire PCB with switches for controlling the operation of the lighting unit mounted thereon and with ends of the pair of signaling light sources mated therewith.
Figure 16:
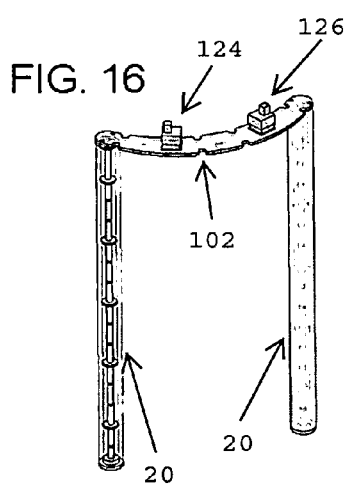
FIG. 16 is another perspective view depicting the entire PCB illustrated in FIG. 15 with control switches mounted thereon and with ends of the pair of signaling light sources mated therewith.
Figure 17:
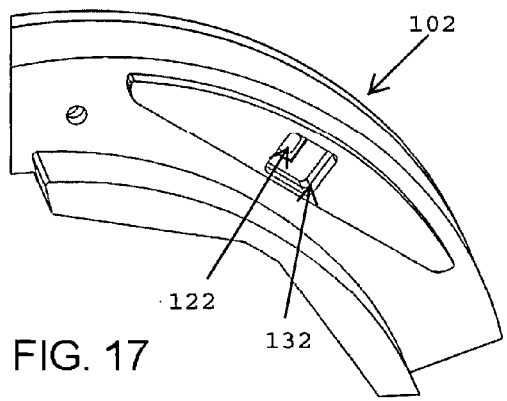
FIG. 17 is a perspective view of a central portion of the PCB having a surface mount RGB LED package thereon, the color of light emitted by the RGB LED being selectable by one of the switches mounted on the PCB.

FIGS. 15 and 16 are alternative views of the PCB 102 at opposite ends of which are respectively juxtaposed light-source end-caps 28 of a pair of signaling light sources 20. Attached at the center of the PCB 102 is a surface mounted personnel identifying RGB LED 122. The PCB 102 also carries a system power switch 124 that is located on the opposite side of the personnel identifying RGB LED 122 and to the left thereof. The system power switch 124 either activates the lighting unit 100 so the signaling light sources 20 emit light, or when the lighting unit 100 is operating turns it off. The PCB 102 also carries a color selection switch 126 on the same side of the PCB 102 as the system power switch 124 but located to the right of the personnel identifying RGB LED 122. The color selection switch 126 permits selecting the color of light emitted by the personnel identifying RGB LED 122 upon activation of the lighting unit 100. Assigning different colors for light emitted from the personnel identifying RGB LED 122 of lighting units 100 carried by different individuals facilitates uniquely identifying personnel in a smoky environment. If the LEDs 32 are RGB LEDs, then the PCB 102 may also carry one or two additional color selection switches, not illustrated in any of the FIGs., for assigning a color of light to be emitted from the signaling light sources 20. FIG. 17 depicts in greater detail a central portion of the PCB 102 with the personnel identifying RGB LED 122 mounted thereon. A sealed optical window 132 covers the personnel identifying RGB LED 122 to direct light emitted by the personnel identifying RGB LED 122 toward the front central area of the lighting unit 100 where the light illuminates translucent symbols 134, 136 that are located on the lighting unit 100 as illustrated in FIG. 12.

Figure 18:
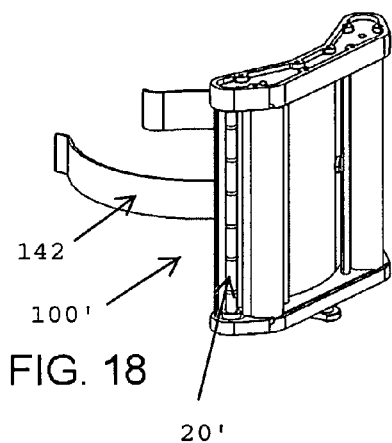
FIG. 18 is a perspective view depicting an alternative embodiment of the lighting unit depicted in FIG. 12 but also having a clip that facilitates attaching the lighting unit to a tank included in a SCBA or a self contained underwater breathing apparatus ("SCUBA")
Figure 19:
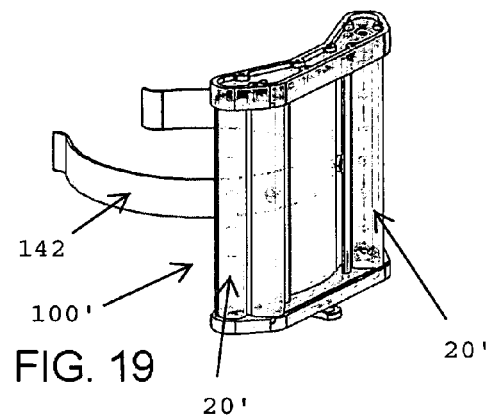
FIG. 19 is a alternative perspective view depicting the alternative embodiment of the lighting unit illustrated in FIG. 18 that shows in greater detail the clip that facilitates attaching the lighting unit to a tank included in a SCBA or a SCUBA.

FIGS. 18 and 19 illustrate an alternative embodiment of the lighting unit 100 depicted in FIG. 12. Those elements depicted in FIG. 1-17 that are common to the alternative embodiment lighting unit illustrated in FIGS. 18 and 19 carry the same reference numeral distinguished by a prime ("'") designation. The lighting unit 100' illustrated in FIGS. 18 and 19 differs from the lighting unit 100 illustrated in FIG. 12 primarily by including a clip 142 that facilitates attaching the lighting unit to a tank included in a SCBA or a SCUBA.

Industrial Applicability

A lighting unit 100 or 100' in accordance with the present disclosure, that is approximately five and one-half (5.5) inches high, preferably houses four (4) AA batteries to energize operation of the LEDs 32 and personnel identifying RGB LED 122 thereof. As with many devices whose operation is powered by batteries, a concern exists about how long the lighting unit 100 or 100' operates before requiring replacing or recharging the batteries. Stated alternatively, a concern exists about electrical power consumed while operating the lighting unit 100 or 100'. To extend battery life, the electronic circuit included in the lighting unit 100 and 100' is capable of energizing LEDs 32 that are specified for operation at current of 300 ma with 50 mS long overdriving 400 mA current pulses that repeat at a 1 Hz frequency. Operation of the personnel identifying RGB LED 122 can also be energized with current pulses having similar characteristics. Energizing operation of the LEDs 32 and personnel identifying RGB LED 122 in this way produces a substantial strobing effect and provides a visual time base to searchers while significantly reducing the average power consumption of the lighting unit 100 or 100'. Furthermore, a flashing light is actually easier for a searcher to detect because human vision responds more to a temporal change, i.e. apparent motion or movement, created by a pulsing light source than to a continuous light source. In addition to the preceding overdriving operating mode, the electronic circuit is also capable of energizing operation of the signaling light sources 20:
  1. in a continuous operating mode; and
  2. in an alternative flashing operating mode that supplies the LEDs 32 with a lesser electrical current than the previously described pulsed operating mode to thereby simultaneously provide the lighting unit 100, 100' both with:

a. acceptable signaling operation; and
b. battery life.

The electronic circuit of the lighting unit 100 and 100' also extends device operation before requiring replacing or recharging the batteries by connecting the LEDs 32 in series while battery operating condition remains adequate for energizing operation of the series connected LEDs 32. When the electronic circuit detects that either battery voltage or battery current drops below a pre-established threshold, the electronic circuit rearranges the connection of the LEDs 32 so they are alternately energized either:
1. in series, i.e. the same electrical current flows through both LEDs 32; or
2. in parallel, i.e. separate electrical currents flowing through both LEDs 32.

Switching between energizing the LEDs 32 in series or in parallel occurs at a sufficiently high frequency that it is visually imperceptible. As the batteries continue discharging and battery operating condition degrades, the electronic circuit progressively increases the amount of time the LEDs 32 receive electrical current while connected in parallel, and progressively decreases the amount of time the LEDs 32 receive electrical current while connected in series.

Advantageously, operation of the electronic circuit for energizing operation of the LEDs 32 in a firefighting environment can respond to smoke density. That is, the electronic circuit included in the lighting unit 100 or 100' adjusts the intensity of light emitted by the signaling light sources 20 responsive to monitored smoke density in the environment around the lighting unit 100, 100'. Preferably, the electronic circuit monitors density of smoke in the environment around the lighting unit 100, 100' by detecting the smoke's occlusion of light. In principle however, the electronic circuit might possibly monitor diffusive back-glow from smoke in the environment around the lighting unit 100, 100' for determining smoke density. If the electronic circuit's monitoring of smoke in the environment around the lighting unit 100, 100' indicates that the smoke is dense, then the electronic circuit increases energy supplied to the LEDs 32 to augment illumination emitted by the signaling light sources 20. Conversely, if the electronic circuit's monitoring of smoke in the environment around the lighting unit 100, 100' indicates that the smoke is sparse, then the electronic circuit decreases energy supplied to the LEDs 32 to reduce illumination emitted by the signaling light sources 20. Similar to pulse operation of the LEDs 32 and the personnel identifying RGB LED 122 described above and to alternating between series and parallel connection of the LEDs 32 also described above, modulating the intensity of illumination generated by the lighting unit 100 or 100' responsive to detected smoke density in the environment around the lighting unit 100, 100' also extends the duration of device operation before requiring replacing or recharging the batteries.

Although the present invention has been described in terms of the presently preferred embodiment, it is to be understood that such disclosure is purely illustrative and is not to be interpreted as limiting. For example, the signaling light source 20 disclosed herein may also be mounted on a firefighter's helmet instead of in the lighting unit 100, 100'. While the present disclosure has been made primarily for use in a firefighting environment, the present disclosure also provides a compact signaling unit that a sportsman, backpacker or bicyclist can easily carry. Similarly, rather than locating a pair of signaling light sources 20 on opposite sides of the lighting unit 100 or 100', one or more signaling light sources 20 together with their control electronics and battery may be packaged in the form of a rod with the LED 32 selected for producing red light. Packaged in this way, the signaling light source 20 can easily be carried in a vehicle to become the equivalent of a conventional road flare. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

What is claimed is:

1. A signaling light source particularly adapted for facilitating the location of personnel under adverse conditions such as in a smoky environment and for resisting damage from exposure to a harsh user environment, the signaling light source comprising:
a hollow, translucent environmental isolation tube;
a light distributing rod that is disposed within the environmental isolation tube, the light distributing rod including a diffusive light-pipe; and
reflective end caps that mate with open ends of the environmental isolation tube and with opposite ends of the light-pipe for sealing the light distributing rod within the environmental isolation tube, at least one of the end caps being juxtaposable with a light source which when energized emits light into the light-pipe of the light distributing rod for reemission from the light-pipe.

2. The signaling light source of claim 1 wherein an outer surface of the light-pipe includes diffusive bands spaced therealong for extracting light therefrom, the extracted light mainly exhibiting uniform brightness along the light distributing rod.

3. The signaling light source of claim 1 wherein the light source is a light emitting diode ("LED").

4. The signaling light source of claim 3 wherein the LED is a monochromatic LED that emits visible light having only a single, fixed color.

5. The signaling light source of claim 3 wherein the LED is a red-green-blue ("RGB") LED that emits visible light whose color is selectable.

6. The signaling light source of claim 3 wherein the LED is a infrared ("IR") LED that emits light which becomes visually perceptible only with the aid of IR light detecting equipment.

7. A lighting unit particularly adapted for facilitating the location of personnel under adverse conditions such as in a smoky environment and for resisting damage from exposure to a harsh user environment, the lighting unit comprising:
a. at least one signaling light source that includes:
i. a hollow, translucent environmental isolation tube;
ii. a light distributing rod that is disposed within the environmental isolation tube, the light distributing rod including a diffusive light-pipe; and
iii. reflective end caps that mate with open ends of the environmental isolation tube and with opposite ends of the light-pipe for sealing the light distributing rod within the environmental isolation tube, at least one of the end caps being juxtaposable with a light source which when energized emits light into the light-pipe of the light distributing rod for reemission from the light-pipe; and
b. at least one personnel identifying RGB LED that emits a selectable color of light for uniquely identifying personnel in a smoky environment.

8. A method for energizing operation of a LED light source included in a signaling light source, the signaling light source being particularly adapted for facilitating the location of personnel under adverse conditions such as in a smoky environment, the signaling light source including:
- a hollow, translucent environmental isolation tube;
- a light distributing rod that is disposed within the environmental isolation tube, the light distributing rod including a diffusive light-pipe; and
- the light source being juxtaposed with an end of the diffusive light-pipe so that when energized the LED emits light into the light-pipe of the light distributing rod for reemission from the light-pipe,
- the method for energizing operation of the LED light source comprising the step of:
- supplying a sequence of electrical current pulses to the LED, the electrical current pulses repeating at sufficiently long intervals of time so that light emitted by the signaling light source pulses visually thereby:
  a. facilitating searchers ability to visually locate personnel; and
  b. reducing electrical power required for operating the signaling light source.

9. A method for energizing operation of at least a pair of LED light sources, each LED light source being included in a signaling light source, each signaling light source being particularly adapted for facilitating the location of personnel under adverse conditions such as in a smoky environment, each signaling light source including:
- a hollow, translucent environmental isolation tube;
- a light distributing rod that is disposed within the environmental isolation tube, the light distributing rod including a diffusive light-pipe; and
- the LED of the signaling light source being juxtaposed with an end of the diffusive light-pipe so that when energized the light source of the signaling light source emits light into the light-pipe of the light distributing rod for reemission from the light-pipe,
- the method for energizing operation of the LED light sources comprising the steps of:
- supplying electrical current for energizing operation of the light sources from at least one battery;
- monitoring battery operating condition; and
- while battery operating condition remains adequate for energizing operation of series connected light sources, connecting the LEDs in series; and
- when battery operating condition becomes inadequate for energizing operation of series connected light sources, connecting the LEDs in parallel,
- thereby extending the battery energized operating interval of the signaling light sources.

10. The method of claim 9 wherein the monitored battery operating condition is voltage.

11. The method of claim 9 wherein the monitored battery operating condition is current.

12. The method of claim 9 wherein the LED light sources, responsive to battery operating condition, are alternatively switched between being connected in series and being connected in parallel at a frequency that is visually imperceptible.

13. The method of claim 12 wherein responsive to battery operating condition degradation, the amount of time the LED light sources receive electrical current while connected in parallel increases, and the amount of time the LED light sources receive electrical current while connected in series decreases thereby further extending the battery energized operating interval of the LED light sources.

14. A method for energizing operation of a LED light source included in a signaling light source, the signaling light source being particularly adapted for facilitating the location of personnel under adverse conditions such as in a smoky environment, the signaling light source including:
- a hollow, translucent environmental isolation tube;
- a light distributing rod that is disposed within the environmental isolation tube, the light distributing rod including a diffusive light-pipe; and
- the light source being juxtaposed with an end of the diffusive light-pipe so that when energized the LED emits light into the light-pipe of the light distributing rod for reemission from the light-pipe,
- the method for energizing operation of the LED light source comprising the steps of:
- monitoring smoke density in environment around the signaling light source;
- when smoke density monitored in environment around the signaling light source indicates dense smoke, increasing energy supplied to the LED light source; and
- when smoke density monitored in environment around the signaling light source indicates sparse smoke, decreasing energy supplied to the LED light source,
- thereby reducing average electrical power required for operating the signaling light source.

* * * * *